(12) United States Patent
Jacob

(10) Patent No.: US 7,604,545 B2
(45) Date of Patent: Oct. 20, 2009

(54) CONSTANT VELOCITY BALL JOINT

(75) Inventor: Werner Jacob, Frankfurt am Main (DE)

(73) Assignees: Shaft-Form-Engineering GmbH, Muehlheim (DE); BF New Technologies GmbH, Ennepetal (DE)

( * ) Notice: Subject to any disclaimer, the term of this patent is extended or adjusted under 35 U.S.C. 154(b) by 0 days.

(21) Appl. No.: 12/062,911

(22) Filed: Apr. 4, 2008

(65) Prior Publication Data

US 2008/0248885 A1 Oct. 9, 2008

Related U.S. Application Data

(63) Continuation of application No. PCT/EP2006/009612, filed on Oct. 4, 2006.

(30) Foreign Application Priority Data

Oct. 5, 2005 (DE) .................. 10 2005 047 863

(51) Int. Cl.
*F16D 3/224* (2006.01)
(52) U.S. Cl. ............................ 464/145; 464/906
(58) Field of Classification Search ......... 464/140–146, 464/906
See application file for complete search history.

(56) References Cited

U.S. PATENT DOCUMENTS

| 5,290,203 A | 3/1994 | Krude |
| 5,624,318 A | 4/1997 | Jacob et al. |
| 6,672,965 B2 | 1/2004 | Hildebrandt et al. |
| 2006/0166751 A1 | 7/2006 | Jacob et al. |

FOREIGN PATENT DOCUMENTS

| DE | 44 19 341 C1 | 11/1995 |
| DE | 100 60 118 C1 | 8/2002 |
| DE | 102 48 372 A1 | 5/2004 |
| WO | WO 03/046397 A1 | 6/2003 |
| WO | WO 2004/036076 A1 | 4/2004 |

OTHER PUBLICATIONS

International Search Report dated Dec. 11, 2006 with English translation (six(6) pages).

*Primary Examiner*—Greg Binda
(74) *Attorney, Agent, or Firm*—Crowell & Moring LLP

(57) ABSTRACT

A ball and socket joint (1) which is constructed as a counter track joint and which includes an inner hub (4) in which first outer grooves (16) and second outer grooves (17) are arranged in an alternating and distributed manner around the axis (9) on the outer surface of the inner hub. An annular cage (5) which is guided on the inner hub (4) is arranged between the inner hub (4) and an outer hub. Insertion surfaces (24, 25) are provided, which extend from the driven-side end, which have an undercut free design, and which extend toward the drive-side end.

9 Claims, 2 Drawing Sheets

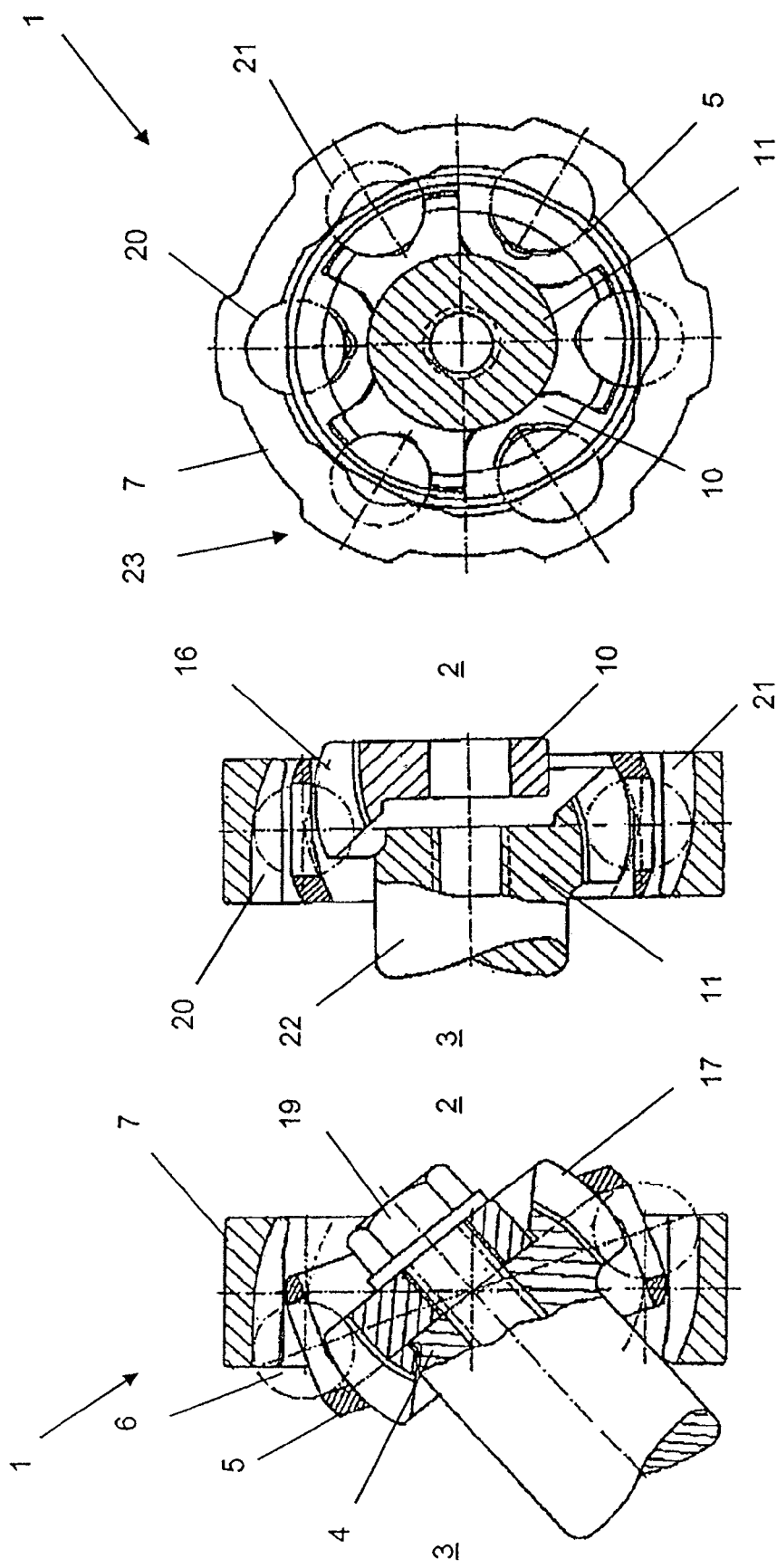

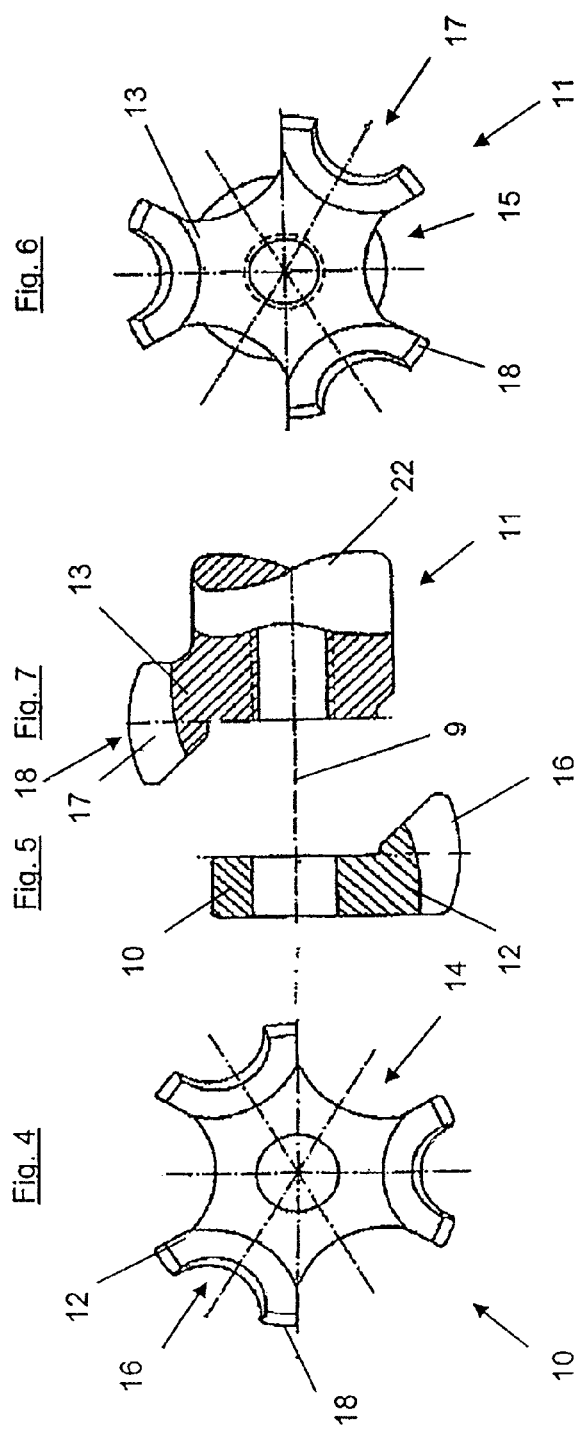
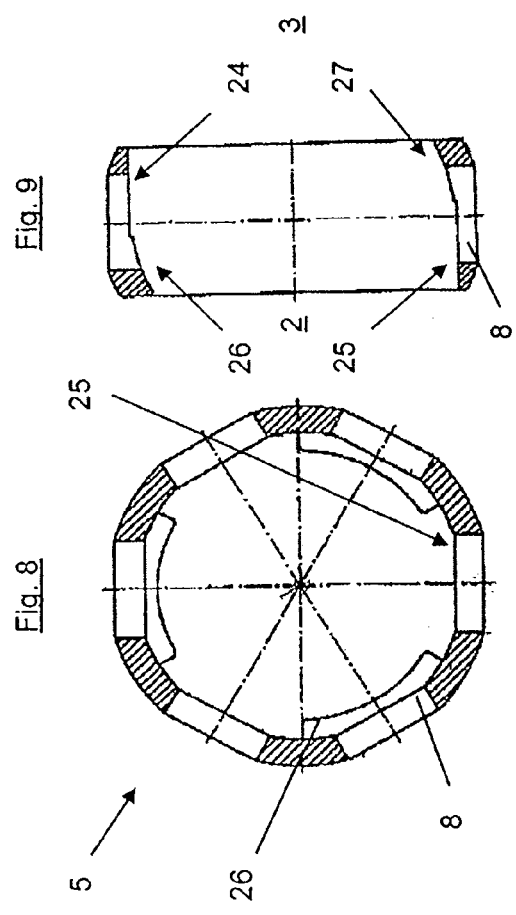

CONSTANT VELOCITY BALL JOINT

CROSS REFERENCE TO RELATED APPLICATIONS

This application is a continuation of international patent application no. PCT/EP2006/009612, filed Oct. 4, 2006, designating the United States of America and published in German on Apr. 12, 2007 as WO 2007/039293, the entire disclosure of which is incorporated herein by reference. Priority is claimed based on Federal Republic of Germany patent application no. DE 10 2005 047 863.8, filed Oct. 5, 2005.

BACKGROUND OF THE INVENTION

The invention relates to a constant velocity ball joint used as an counter track joint for connection with the longitudinal shaft or axle shaft of a motor vehicle, for example.

US patent publication no. 2006/0166751 (=DE 102 48 372) discloses such an counter track joint, which has an inner hub and an outer hub and a substantially annular cage guided therebetween. Both in the inner hub and the outer hub running grooves are formed, which are associated with each other in pairs and in which balls arranged in the cage are displaceably held. The track base of the inner hub and the outer hub running grooves which are associated with each other in pairs approaches alternately from a first end of the counter track joint in the direction toward the second end and from the second end in the direction toward the first end. The inner hub comprises two elements, which are in claw-like engagement when assembled and are arranged substantially in series on the inner hub axis, such that the first element has the first inner running grooves and the second element has the second running grooves.

In this known joint, the cage is guided in the outer hub. For this purpose, the webs arranged between the outer running grooves must be configured as cage guiding surfaces. Forming the cage guiding surfaces and the outer running grooves with high precision on the inner face of the outer hub can increase production complexity in some special applications.

U.S. Pat. No. 6,672,965 (=DE 100 60 118), for example, further discloses an counter track joint in which the cage has a spherical outer face that is guided in one direction in undercut-free stop surfaces and guide surfaces of the outer joint part. The cage of this known joint also has undercut-free stop surfaces and guide surfaces in the other axial direction, which together with a spherical outer face of the inner joint part serve to guide the cage. In this known fixed counter track joint the inner joint part can be inserted into the ball cage and the ball cage together with the inner joint part can be inserted into the outer joint part, but the balls must each be manually inserted into the cage and the running groove pairs. This takes a substantial amount of time and adversely affects the cost of producing the joint.

SUMMARY OF THE INVENTION

An object of the present invention is therefore to provide a joint of the above-described type which is easier to manufacture mechanically and easier to assemble.

According to the invention, this and other objects are achieved in that the cage, which is preferably guided on the inner hub, has first insertion surfaces that extend undercut-free on its inner face from the drive side end toward the driven or output side end and second insertion surfaces that extend undercut-free from the driven side and in the direction toward the drive side end. These insertion surfaces are constructed such that the elements of the inner hub, which are in claw-like engagement, can be inserted into and connected to the cage from opposite ends. This configuration of the constant velocity ball joint according to the invention simplifies the production of the outer hub because only the outer running grooves must be formed with high precision, and there is no need to form additional cage centering surfaces in the outer hub with high precision. Assembly of the joint according to the invention is also simplified because the cage can be inserted or pivoted into the outer hub. In this position all the balls can be inserted into the windows of the cage and the outer running grooves, where they can be held with lubricating grease, for example. The two elements of the inner hub can then be inserted into the outer hub and the cage from opposite ends of the joint and connected to each other. It is therefore no longer necessary to insert the balls separately into the windows of the cage by overbending the joint. As a result, assembly of the joint is substantially simplified and therefore faster.

To center the cage and the balls when the constant velocity ball joint is at rest, the elements of the inner hub have first and second cage centering surfaces, preferably adjacent the first and second inner running grooves, to guide first and second guide surfaces that are provided on the inner face of the cage, adjacent the insertion surfaces.

In one preferred embodiment of the invention, the elements of the inner hub, which are in claw-like engagement when assembled, are each formed by a cylindrical section from which shell-like projections protrude, which form an inner running groove and cage centering surfaces, respectively. The cylindrical sections of the two elements of the inner hub are preferably arranged substantially in series on the inner hub axis. To enable a claw-like engagement of the two elements, recesses are formed in the one element, which correspond in size and contour to the shell-like projections on the other element. The two elements forming the inner hub therefore adjoin tangentially in a positive locking manner.

If the cage has a partially spherical outer face that is flattened in the area of the windows such that the outside diameter of the cage is smaller than or equal to the inside diameter of the outer hub, the cage can be inserted into, and coaxially with, the outer hub without pivoting the cage. This substantially facilitates assembly of the constant velocity ball joint according to the invention.

To ensure that the two elements forming the inner hub are also properly connected in axial direction, the elements can be screwed together. To this end one of the elements forming the inner hub can, for example, be provided with a central through-hole and the other element with a threaded hole, which is coaxial with the through-hole. A threaded bolt can then be used to connect the two elements to each other.

If the two elements are essentially solid formed parts produced by chipless machining, these elements forming the inner hub can be fabricated with especially high precision. The running grooves and the projections and recesses of the two elements adjoining each other can be formed with great accuracy and consistent quality in a stamping process, for example. It is also possible, however, to perform some of the machining steps, such as forming the through-hole and the threaded hole to connect the elements to each other, in a chip-removing process step. Even for small series it can be advantageous to fabricate the two elements by original forming or chip-removing production processes.

According to one preferred embodiment of the invention, one of the two elements being joined to form the inner hub is the end of a shaft or a shaft journal. This facilitates connection of the counter track joint of the invention to a shaft or the like.

As an alternative, one of the elements can be integrally formed with a sleeve that is provided with internal profiling for connection to a shaft end or a shaft journal.

To obtain a particularly compact joint, the preferred number of running grooves in the outer hub and the inner hub is six. It is also feasible, however, to design a joint according to the invention with four, eight or more pairs of running grooves.

For a rotationally fixed connection of the outer hub to a corresponding seat, the outer hub, in a preferred embodiment of the invention, has an undercut-free outer face with profiling. The constant velocity ball joint according to the invention can therefore be mounted as a fully assembled, compact slide-in unit in a correspondingly configured seat.

If each of the outer running grooves is assigned a projection on the outer face of the outer hub, the projections can serve as profiling for the rotationally fixed connection of the outer hub to a corresponding seat. At the same time, the outer hub in this configuration has an at least largely constant wall thickness distribution, which is advantageous not only for hardening but also to ensure a uniform force and torque uptake.

As a joint with a narrow angle, the constant velocity ball joint according to the invention can have a maximum bending angle between the inner hub and the outer hub of approximately ±24°. The joint design according to the invention, however, even allows a maximum bending angle between the inner hub and the outer hub of approximately ±40°.

The invention further relates to a jointed shaft, such as a longitudinal shaft or axle shaft used as a drive shaft in motor vehicles, with a constant velocity ball joint as described above. Preferably, the constant velocity ball joint is preassembled and provided as a compact slide-in unit.

Further developments, advantages and possible applications of the invention will become evident from the following description of illustrative embodiments and from the drawings. All the features described and/or illustrated constitute the subject matter of the invention either by themselves or in any combination, regardless of their summarization in the claims or the relationship of the claims.

BRIEF DESCRIPTION OF THE DRAWINGS

The invention will be described in further detail hereinafter with reference to illustrative preferred embodiments shown in the accompanying drawing figures, in which:

FIG. 1 is a schematic sectional view of a constant velocity ball joint according to the present invention;

FIG. 2 is a sectional view of the constant velocity ball joint according to FIG. 1 during assembly of the inner hub;

FIG. 3 is a sectional view of the constant velocity ball joint according to FIG. 2 taken along line III-III;

FIG. 4 is a front elevational view of one element of the inner hub;

FIG. 5 is a sectional view through the element of FIG. 4;

FIG. 6 is a rear view of the other element of the inner hub;

FIG. 7 is a sectional view through the element of FIG. 6;

FIG. 8 is a section of the cage of the constant velocity ball joint according to the invention, and FIG. 9 is a section of the cage shown in FIG. 8 taken along line IX-IX.

DETAILED DESCRIPTION OF PREFERRED EMBODIMENTS

The constant velocity ball joint 1 depicted in the figures has a first drive side end 2 and a second driven side end 3. The terms "drive side" and "driven side" are used purely as an example to help distinguish the two ends. The two ends are of course likewise suited for connection to a driving or a driven component.

The constant velocity ball joint 1 in a manner known per se has an inner hub 4, a cage 5 with balls 6 inserted therein, and an outer hub 7. The balls 6 are held in windows 8 of the cage 5.

As may be seen particularly from FIG. 2 and 4 through 7, the inner hub 4 is formed of two parts. A first element 10 and a second element 11 are arranged substantially in series on the central inner hub axis 9. The two elements 10 and 11 forming the inner hub 4 are alternately provided with projections 12 or 13 and recesses 14 or 15, which are in claw-like engagement as shown in FIG. 2. The projections 12 and 13 of the two elements adjoin tangentially in a positive locking manner. In the embodiment shown, both the projections 12, 13 and the recesses 14, 15 are part circular in shape.

A first inner running groove 16 is formed in each of the projections 12 of the first element 10. Second inner running grooves 17 are formed in the projections 13 of the second element. The first inner running grooves 16 extend undercut-free from the drive side end 2 in the direction toward the driven side end 3, such that their track base approaches the inner hub axis 9. By contrast, the second running grooves 17 of element 11 extend undercut-free from the driven side end 3 in the direction toward the drive side end 2, such that their track base approaches the inner hub axis 9.

Adjacent the inner running grooves 16 and 17, first and second cage centering surfaces are formed on projections 12 and 13, respectively. The cage centering surfaces 18 together form a partly spherical surface by which the cage 5 is guided on the inner hub 4.

As may be seen from FIG. 1, the two elements 10 and 11 that form the inner hub 4 are axially interconnected by a screwed connection using a threaded bolt 19.

The outer hub 7 is an annular single-piece component whose axis coincides with the inner hub axis 9 of the inner hub 4 when the constant velocity ball joint 1 is in its extended position. On the inner face of the outer hub 7, first and second outer running grooves 20 and 21 are formed, which are evenly and alternately distributed about the outer hub axis. In the finally assembled state of the constant velocity ball joint 1, the first inner running grooves 16 of the inner hub 4 are opposite the first outer running grooves 20 of the outer hub 7, and the second inner running grooves 17 are opposite the second outer running grooves 21, so that they form running groove pairs respectively. A ball 6 held in the cage 5 is guided in each of these running groove pairs.

The first outer running grooves 20 of the outer hub 7 extend undercut-free from the drive side end 2 in the direction toward the driven off side end 3, such that their track base moves away form the outer hub axis. The second outer running grooves 21, by contrast, extend undercut-free from the driven side end 3 in the direction toward the drive side end 2, such that their track base also moves away from the outer hub axis.

To connect the constant velocity ball joint 1, the second element 11 of the inner hub 4 is integrally formed with a shaft 22. As an alternative, the element 11 of the inner hub can also be formed as a sleeve with internal profiling, for example. On the outer face of the outer hub 7, profiling is provided for the rotationally fixed connection of the outer hub to a corresponding seat (not shown in the figures). To this end, each outer running groove 20 or 21 is assigned a projection 23 on the outer face of the outer hub 7.

The cage 5 in the embodiment illustrated in FIGS. 8 and 9 is formed by a single-piece closed ring in which the cage windows 8 are provided. First undercut-free insertion surfaces 24 extending from the driven side end 3 in the direction toward the drive side end 2 and second undercut-free insertion surfaces 25 extending from the drive side end 2 in the direction toward the driven side end 3 are provided on the inner face of the cage 5. In the embodiment shown, the insertion surfaces 24 and 25 are configured as at least approximately axially parallel surfaces, so that the elements 10 and 11 forming the inner hub 4 can be inserted into the cage 5 from opposite ends, without interference from the spherical cage centering surfaces 18.

First guide surfaces 26, which are partly spherical, are provided axially behind the first insertion surfaces 24, i.e., on the drive side end 2 of the cage 5, adjacent the insertion surfaces 24. Correspondingly, second guide surfaces 27, which are likewise partly spherical, are formed on the driven side end 3 of the cage 5, adjacent the second insertion surfaces 25. As may be seen from FIG. 2, the spherical cage centering surfaces 18 of the first element 10 are thus adjacent the second guide surfaces 27 of the cage 5, while the second cage centering surfaces 18 of the second element 11 are adjacent the first guide surfaces 26 of the cage 5. This centers the cage 5 in the constant velocity ball joint 1 when the joint is at rest.

The assembly of the constant velocity joint 1 will now be described. First, the cage 5 is inserted into the outer hub 7. The outer face of the cage 5 is flattened at least in the area of the cage windows 8 such that the outside diameter of the cage 5 is smaller than or equal to the inside diameter of the outer hub 7. The cage 5 can therefore be inserted into the outer hub 7 from both the drive side end 2 and the driven side end 3 in a position in which the axes of the outer hub 7 and the cage 5 coincide.

All the balls 6 can now be inserted into the windows 8 of the cage 5 and the outer running grooves 20 or 21 of the outer hub 7 from the inside. Optionally, the balls 6 can be held in the cage 5 and the outer hub 7 by lubricating grease or the like.

When all the balls 6 have been accommodated in the cage 5 and the outer hub 7, the inner hub 4 can be placed into the constant velocity ball joint 1 by inserting the first element 10 into the cage 5 from the drive side end 2 and by inserting the second element 11 into the cage 5 from the driven side end 3 and connecting it claw-like with the first element 10. The respective projections 12 and 13 of the two elements 10, 11 engage in the recesses 14 and 15 of the respective other element. To fix the two elements axially, the threaded bolt 19 is guided through the through-hole provided in the first element 10 and screwed into the threaded hole provided in the second element 11.

The two elements 10 and 11 can be inserted into the cage 5 only in the position in which the projections 12 and 13 of the two elements are aligned in relation to the insertion surfaces 24 and 25 on the inner face of the cage 5. The two elements can be inserted into the cage 5 far enough and connected so that they engage until the cage centering surfaces 18 of the two elements abut the guide surfaces 26 or 27 of the cage 5.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A constant velocity ball joint constructed as an counter track joint and having a drive side end and a driven side end and an inner hub, on whose outer face first inner running grooves and second inner running grooves are arranged in alternate distribution about the inner hub axis, wherein the inner hub comprises at least two elements which are in claw-like engagement when assembled and are arranged substantially in series on the inner hub axis and a first element of which is provided with the first inner running grooves and a second element of which is provided with the second inner running grooves, an outer hub on whose inner face first outer running grooves and second outer running grooves are arranged in alternate distribution about the outer hub axis, wherein the first inner running grooves are opposite first outer running grooves and the second inner running grooves are opposite second outer running groves, such that they from pairs with each other, and an annular cage, which is arranged between the inner hub and the outer hub and has windows in which balls that are engaged in the running grooves are guided for torque transmission, wherein:

the cage, on its inner face, has first undercut-free insertion surfaces extending from the driven side end in the direction toward the drive side end and second undercut-free insertion surfaces extending from the drive side end in the direction toward the driven side end, which insertion surfaces are configured such that the elements of the inner hub which are in claw-like engagement can be inserted into the cage and connected thereto from opposite ends;

the elements of the inner hub have first and second cage centering surfaces adjacent the first and second inner running grooves to guide first and second guide surfaces, which are provided adjacent the insertion surfaces on the inner face of the cage;

first guide surfaces, which are partly spherical, are provided axially behind the first insertion surfaces on the drive side end of the cage adjacent the insertion surfaces, and second guide surfaces, which are partly spherical, are provided on the driven side end of the cage adjacent the second insertion surfaces; and the cage centering surfaces of the first element lie adjacent the second guide surfaces of the cage, and the second cage centering surfaces of the second element lie adjacent the first guide surfaces of the cage.

2. A constant velocity ball joint as claimed in claim 1, wherein the elements of the inner hub each have a cylindrical section from which shell-like projections protrude, which form an inner running groove and cage centering surfaces, respectively.

3. A constant velocity ball joint as claimed in claim 1, wherein the cage has a partly spherical outer face, which is flattened at least in the area of the windows such that the outside diameter of the cage is smaller than or equal to the inside diameter of the outer hub.

4. A constant velocity ball joint as claimed in claim 1, wherein the two elements are releasably interconnected by a threaded connection.

5. A constant velocity ball joint as claimed in claim 1, wherein the two elements of the inner hub and/or the outer hub are solid formed parts substantially produced by chipless machining.

6. A constant velocity ball joint as claimed in claim 1, wherein one of the elements forms the end of a shaft or shaft journal.

7. A constant velocity ball joint as claimed in claim 1, wherein the number of running groove pairs is six.

8. A constant velocity ball joint as claimed in claim 1, wherein a projection is associated with each outer running groove on the outer face of the outer hub.

9. A constant velocity ball joint as claimed in claim 1, wherein the maximum bending angle between the inner hub and the outer hub is approximately ±40°.

* * * * *